(12) United States Patent
Drucker et al.

(10) Patent No.: US 7,437,005 B2
(45) Date of Patent: Oct. 14, 2008

(54) RAPID VISUAL SORTING OF DIGITAL FILES AND DATA

(75) Inventors: Steven M. Drucker, Bellevue, WA (US); Curtis Wong, Bellevue, WA (US); Asta J. Roseway, Redmond, WA (US); Steven C. Glenner, Bellevue, WA (US); Steven D. DeMar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 423 days.

(21) Appl. No.: 10/893,064

(22) Filed: Jul. 17, 2004

(65) Prior Publication Data

US 2005/0192924 A1    Sep. 1, 2005

Related U.S. Application Data

(60) Provisional application No. 60/545,268, filed on Feb. 17, 2004.

(51) Int. Cl.
*G06K 9/62* (2006.01)

(52) U.S. Cl. .................. 382/224; 382/205; 715/838; 715/784; 707/7

(58) Field of Classification Search .................. None
See application file for complete search history.

(56) References Cited

U.S. PATENT DOCUMENTS

| | | | | |
|---|---|---|---|---|
| 6,069,606 | A | 5/2000 | Sciammarella et al. | 345/127 |
| 6,810,149 | B1 * | 10/2004 | Squilla et al. | 382/224 |
| 2003/0120673 | A1 | 6/2003 | Ashby et al. | 707/100 |
| 2004/0068423 | A1 * | 4/2004 | Shaw | 705/3 |
| 2004/0101212 | A1 * | 5/2004 | Fedorovskaya et al. | 382/305 |

FOREIGN PATENT DOCUMENTS

| | | |
|---|---|---|
| EP | 1148412 A2 | 10/2001 |
| EP | 1150215 A2 | 10/2001 |
| EP | 1182585 A2 | 2/2002 |
| EP | 1209589 A2 | 5/2002 |
| EP | 1369792 A2 | 12/2003 |
| WO | WO03/003343 | 1/2003 |

OTHER PUBLICATIONS

EP Search Report for Application No. EP05100986.

(Continued)

*Primary Examiner*—Hosain T Alam
*Assistant Examiner*—Christopher J Raab
(74) *Attorney, Agent, or Firm*—Workman Nydegger

(57) ABSTRACT

Described is a system and method including a user interface to manage sets of digital data (e.g., files) such as digital photographs or email messages. The system and method comprise a rapid sort mechanism and an underlying support mechanism that associates metadata with each set of digital data, including annotation metadata obtained from the sort mechanism. As the user scrolls through images that represent the sets of digital data and categorizes them, metadata as to its particular categorization or lack of categorization is implicitly obtained and associated with each set of digital data. Grouping of sets of digital data into clusters is also provided, with a visual indication as to which cluster a set of digital data belongs. With respect to digital photography, the system and method makes annotating and classifying digital photographs significantly easier and faster than contemporary photograph management mechanisms.

26 Claims, 9 Drawing Sheets

OTHER PUBLICATIONS

US2003/0138148 A1 (Itou Hiroaki) Jul. 24, 2003 * paragraph '0016!—0018!; figure 1 *.
Kuchinsky A. et al: "Fotofile: A Consumer Multimedia Organization and Retrieval System" CHI 1999 Conference Proceedings Human Factors in Computing Systems. Pittsburgh, PA May 15-20, 1999, CHI Conference Systems, and New York, NY: ACCM, US, May 15, 1999, pp. 496-503, XP000894256. IDBN: 0-201-48559-1 *p. 497, right-hand column, line 30= p. 498, left-hand column, line 21; figure 1*.

* cited by examiner

RAPID VISUAL SORTING OF DIGITAL FILES AND DATA

CROSS-REFERENCE TO RELATED APPLICATION

The present invention claims priority to U.S. provisional patent application Ser. No. 60/545,268 filed Feb. 17, 2004, and incorporated herein in its entirety.

FIELD OF THE INVENTION

The invention relates generally to computer systems, digital files and data, and more particularly to managing digital files and data such as digital photographs on a computer system.

BACKGROUND OF THE INVENTION

Computer files need to be arranged in some manner that allows the user to figure out which one is which. At present, however, it is pretty much up to the user to come up with a useful scheme, such as by providing a meaningful name for each file and folder and some type of folder hierarchy, and then fit each file into the scheme when it is saved. This works well for a file that fits into one category, and retain its basic characteristics, e.g., a user may have a parent folder for work projects, with a subfolder for each particular project, and then put any document related to a particular project into its corresponding folder.

However, for many users, there are possibly many files that do not fit into the traditional folder hierarchy scheme. For example, most users would prefer to sort digital photographs by other criteria, such as the way they look, whether they are to be printed, shared, posted to the web, saved for subsequent filtering. While it is possible to use different folders for each such category, this is slow and may lead to unnecessary duplication. Indeed, as the number of digital photographs increases in a user's collection, such as into the thousands, managing them becomes a difficult task, in part because digital photographs are maintained on a computer system as any other file.

What is needed is a mechanism that facilitates the management of digital files and digital data such as photographs, including providing a rapid and convenient sorting mechanism.

SUMMARY OF THE INVENTION

Briefly, the present invention provides a system and method including a user interface to manage sets of digital files or data, comprising a rapid sort mechanism and an underlying support mechanism that associates metadata with the digital files or data, including annotation metadata obtained from the sort mechanism. Clustering of digital files and data sets into groups is also provided.

In one implementation, a sorting program facilitates rapid, convenient categorization of digital data such as digital photographs or email data, by providing a user interface that allows a user to scroll through all (or an appropriate subset of) the data and select (or fail to select) a category for each one. The sets of data (e.g., digital photographs) are arranged to scroll according to one or more criteria, such as according to the time and date that each digital photograph was taken, or when an email message was received. In one example implementation, left and right cursor keys are used to scroll to a selected set of data, while the up and down cursor keys can be used to identify a category (e.g., "Best" or "Reject") for that selected set of data as desired. Other scrolling mechanisms, including automatic scrolling and/or scrolling based on pointing device commands are alternatively described. In each user interface, a visual indication provides feedback to the user as to the categorization, which may be default categories or user-defined categories.

As the user scrolls and categorizes, metadata is implicitly obtained and associated with each set of digital data, as to its categorization or lack of categorization. Thereafter, the metadata may be read in conjunction with the digital files to produce some output. For example, with digital photographs, a presentation may be automatically generated based on the categorization data (e.g., using images in a "To Present" category), emails may be sent (e.g., using images in a "To Email" category), images may be posted to a website, (e.g., using images in a "To Post" category), others may be printed (e.g., using images in a "To Print" category) and so forth; a single digital file may belong to more than one such category. Other metadata may be used in conjunction with the categorization metadata, such as time data and location data.

In various user interface implementations, scrolling is generally linear, from right-to-left and vice-versa, with the selected data (e.g., photograph) being centered and the largest, with surrounding sets of data visible but progressively decreasing in size. As a result, the context from surrounding data is visible. For photographs, thumbnail images appear in representative category locations, indicating which photographs have been categorized, with the currently-selected photograph (if categorized) having a slightly-larger zoomed thumbnail.

If desired, the user may add an explicit annotation to the selected set of digital data in addition to the category (which is an implicit annotation). For example, another keyboard key and/or a pointer selection of a menu item can allow a user to type, handwrite, add audio and so forth to the currently selected set of data. By having the annotation (which may be the actual data or a link to a data file) remain part of the metadata, the user may use a post-processing program to have the annotation appear in conjunction with the set of data if visible, or if an audio annotation, to be heard in conjunction with the set of data.

Clustering (or grouping) is provided, such as to provide context to the user when sets of data are in immediate temporal proximity with each other, or grouped by some other criteria. For example, with digital photographs, clustering by time is often useful with in portraits or group shots, where a single best image is desired. The user interface may be arranged to indicate in advance that a number of similar shots are coming, such as by having different color frames around the photographs of different clusters, by having something on the display such as hash marks indicate where clusters start and end or by having spacing between clusters of photographs to give some indication of the difference in time between when the shots were taken. Clustering need not be by time, but instead may be accomplished with other metadata, such as location data or user-assigned cluster information.

A single image representative of a digital data set may be presented on the computer screen to provide for greater scrutiny. Alternatively, two or more images may be displayed at the same time to allow for rapid comparisons. A secondary selection mechanism or cluster-selection mechanism is provided for such multiple image viewing. A big screen such as a high-definition television monitor may be used in conjunction with the computing device that is running the sorting program, whereby larger images may be reviewed for sorting, possibly by multiple reviewers.

Other advantages will become apparent from the following detailed description when taken in conjunction with the drawings, in which:

DETAILED DESCRIPTION

Exemplary Operating Environment

Figure 1:
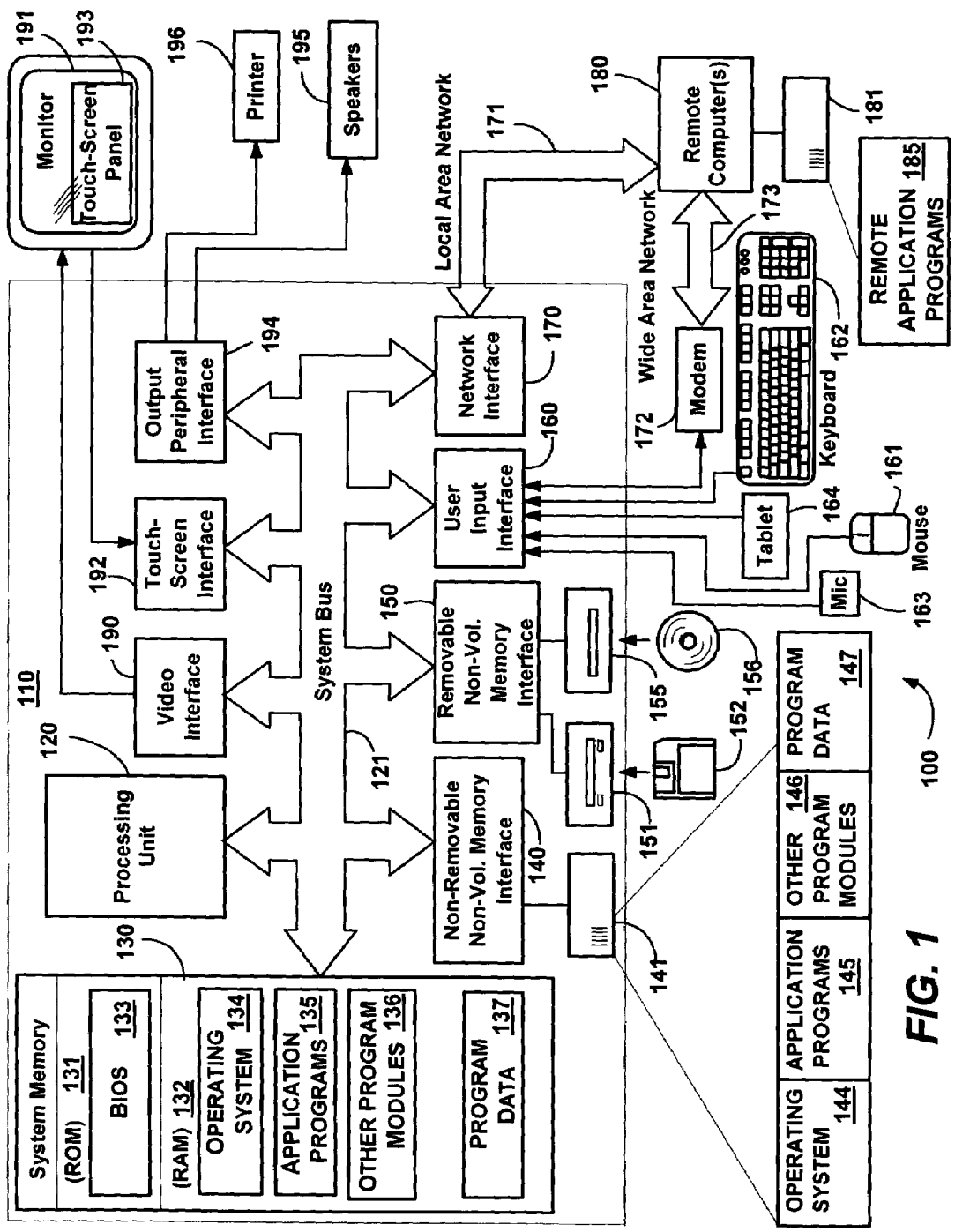
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170, and particularly may include one configured for wireless networking. When used in a WAN networking environment, the computer 110 may also include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Digital File Management

The present invention is generally directed towards managing digital files such as digital photographs or other visible images. However, as will be understood, while digital photographs will be used in the examples herein, the present invention is not limited to digital photographs, files and/or images, but rather can be applied to numerous other types of digital data. For example, email messages can be rapidly sorted and/or categorized using the technology described herein; the image can contain the message data, and even allow for editing within the image.

Figure 2:
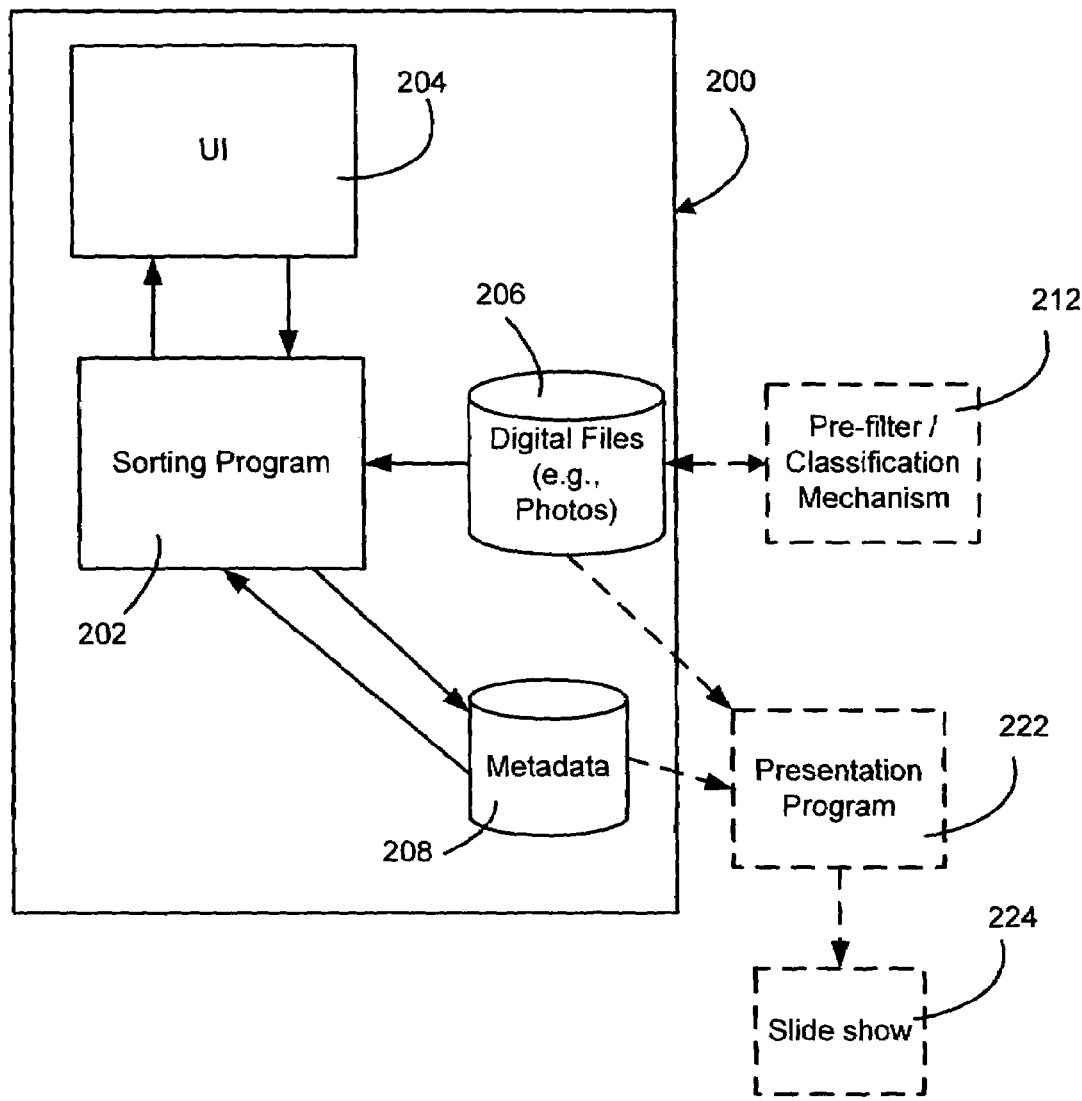
FIG. 2 is a block diagram generally representing an architecture comprising components suitable for use with various aspects of the present invention.

Turning to FIG. 2 of the drawings, an underlying architecture 200 is represented, including a sorting program 202 which provides a user interface 204. The user interface 204 may include a conventional keyboard or touch-screen display.

In general and as described below, the sorting program 204 facilitates rapid, convenient categorization of digital data. For example, in a digital photograph management environment, the sorting program 202 may be used to sort a user's photographs into a number of categories, such as "Hidden/Private," "Majority," "Highlights," "Best" and/or "Representative." Note that some categories may be provided by default (e.g., "Like," "Dislike" and "Skip"), however other categories may be user-specifiable. For example, beyond the example categories listed above, a user may specify categories such as "To print," "To edit" "For Mom," "Smiles" and so forth, and sort images into those categories. Further, note that there is no limit to the number of categories, other than possibly a practical limit based on available distinct regions on the screen that can be used to form discernable targets, e.g., with enough screen real estate. Moreover, by allowing a user to secondarily sort one category into subcategories at a later time, such as a "Best" category secondarily sorted into "Keep for Later" and "Print" subcategories, a user's options are virtually unlimited. Other potential categories include ranking or assigning other numeric values, such as to assign a photograph a numeric or other value. Numeric values or the like may be used as subcategories as well, e.g., the "Best" category may have its photographs secondarily ranked from one (1) to n, or may have its photographs assigned a score from one (1 being worst within "Best") to five (5 being best of the "Best") and so forth.

The sorting program 202 may be a stand-alone application program, or may comprise a component that is coupled to another photo-management application or is incorporated into the operating system, e.g., as a shell component. In general, the user interacts through the user interface 204 to mark digital files 206 with metadata 208 that describes the user's categorization of each digital file; (note that the metadata and digital files may be maintained separately or within a common database).

Note that prior to sorting/classification via the present invention, other automated (or manual) processes may be employed to facilitate management of the digital data. For example, via a separate program 212 (which alternatively may be a subcomponent of the sorting program), the user may choose to automatically filter out and/or automatically pre-classify some of the data; note that such a pre-filter/pre-classification mechanism 212 is not necessary to the invention, as indicated by the dashed box in FIG. 2.) By way of example, if a blur detection filter is available, the user may choose to automatically assign a certain value to blurry pictures, and then not classify them thereafter with the sorting mechanism 202 of the present invention (or even see them when sorting other photographs). As another example, with a face detection filter mechanism, the user may use the filter so as to only sort/classify photographs with faces in them (or conversely, photographs without faces in them). As can be readily appreciated, other automatic or manual mechanisms may be alternatively employed to narrow (filter and/or classify) the set of digital data from a larger collection to a smaller subset, prior to classification via the present invention.

Following the sorting process of the present invention, (which may have followed a pre-filtering, pre-classification process), the metadata 208 may be read in conjunction with the digital files to produce some output. For example, a presentation program 222 can be used to build or otherwise output a slide show 224 or the like, although not necessary to the invention (as indicated by the dashed boxes). Other examples include a program that allows a user to do more conventional things such as print, email, and/or post digital photographs on the web; note however that by interpreting (and possibly copying) the metadata, the program that processes the digital files can do more, e.g., print out only those files designated for printing. Essentially any program that can interpret the metadata can be used for automatically filtering and/or processing the image once categorized as desired.

With respect to digital photography, the present provides an easy and rapid mechanism to go through photos to mark them for printing, for sharing, or for slideshows, and thus overcomes a number of drawbacks that previously required creating separate versions of the photos and copying them into separate folders. To that end, the present invention provides a sorting metaphor that adds implicit metadata when one first goes through the photos.

Figure 3:
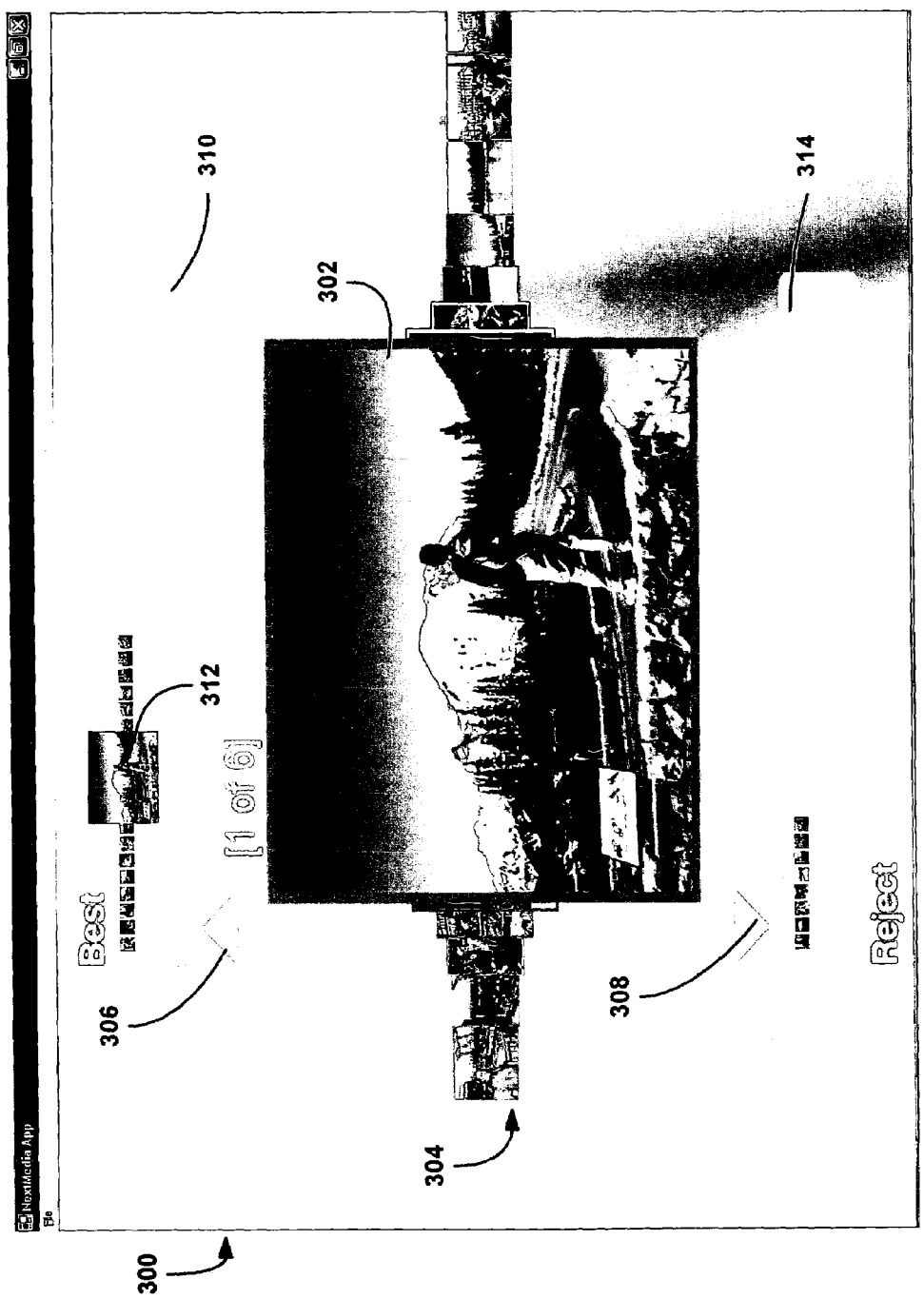
FIG. 3 is a representation of an example screenshot showing a user interface for rapidly sorting digital data (photographs) in accordance with various aspects of the present invention.

In one example implementation represented by the screenshot 300 of FIG. 3, a user can quickly interact to categorize photographs as desired. For example, a user can scroll through a large set of digital photographs (or other data) very rapidly using left and right cursor keys. The digital photographs are time-stamped, and may be arranged to scroll by time, such as oldest being leftmost to newest being rightmost, or vice-versa. Other ways of arranging the digital photographs for scrolling are feasible, such as to show those that have not been classified first. Time ordering, however, provides a user with a great deal of context as the user generally will know what photographs were taken around the time of others.

When scrolling, the user is presented with a selected photograph 302 which stands out in some manner from others in the set of digital photographs 304, such as by being larger than the rest. In addition to showing selection, it is readily appreciated that a larger display gives a user a better opportunity to review an image for categorization. Another visual indication such as a highlighted border around the currently-selected photograph may be alternatively provided.

In accordance with an aspect of the present invention, the user interacts with the sorting program 202 (FIG. 2) to place the selected digital data into a category. The sorting concept (referred to in U.S. provisional patent application Ser. No. 60/545,268 as photo-triage) is generally based on the process that picture-takers typically used to go through when first receiving pictures back from a photo processor, in which the recipient would go through a stack of photos and quickly sort pictures into different groups such as good, bad, private, and so forth. This could be done in collaboration with others or as an individual process. Thereafter, people might iteratively go through the favorites and pull out the best of those.

The present invention operates by providing a rapid sorting mechanism that also implicitly tags the photos with metadata. For example, the user is presented with slideshow or filmstrip view, and by interacting with the user interface 204 (FIG. 2), the user may rapidly scroll left through the set of photographs 304 by holding down or repeatedly tapping the left cursor key, and conversely scroll right via the right cursor key. The speed can be set to a default, e.g., the scrolling will update with a new image every half-second, but can be user-configurable to anything that the user is comfortable with. A behavior to cycle the images onto the next one can be added so that users do not need to interact with the interface except when desired, creating a kind of slideshow. For example, the user or default startup can perform automatic scrolling, showing each image in succession for some period of time until otherwise halted, e.g., by user input or the last image being reached. Also, the image that is currently-selected image may be slowly zoomed larger to enable examining details until the person chooses in which category the image should be assigned, or if not chosen by a certain time limit, another image may be made to appear as the currently-selected image, possibly after zooming out the previous image. For users with large numbers of photographs, the user can jump to a photograph based on a particular time, or various other shortcut mechanisms may be employed, e.g., something analogous to the "scene selection" option on a DVD movie.

Selection is thus performed in the context of a user looking at his or her digital photographs in a natural manner. Once an image 302 is selected, sorting may be accomplished rapidly, such as via up and down cursor keys, as indicated to the user by the guide arrows 306 and 308, respectively, in FIG. 3. Simply by using left and right cursor keys to stop on a selection and then using the up or down cursor keys, the user can assign a photograph to a category. Note that simply by moving an image into a category, metadata is implicitly assigned to the image. Further, note that not assigning a category also implicitly assigns metadata, e.g., a neutral or unsure state. A distinction may be made in the metadata between neutral because not yet viewed and neutral after having been viewed.

For a visual indication of the selection, a thumbnail image is made to appear in a representative category location. Note that if already assigned to a category, such as the "Best" category 310 in FIG. 3, the thumbnail image may be shown as a zoomed image 312, thereby notifying the user of its assigned status. Note that it is possible to have another indication of the data's status; for example using differently colored frames around an image may indicate its category, such as green for Best, red for Reject, and so forth.

In the situation shown in FIG. 3 in which the selected photograph 312 is already categorized as best, the "Up" cursor would not have any meaning and thus would be ignored, while the down arrow removes the classification, (with a double-down arrow required to categorize the digital photograph into the reject category area 314). Note that a single cursor actuation could move an image to another category, however some mechanism should be available to remove any categorization from an image, such as to leave the decision until later or to obtain a second opinion if unsure.

If desired, the user may add an explicit annotation to the selected photograph other than only the category (which itself is one type of implicit annotation). For example, another keyboard key and/or a pointer selection of a menu item can allow a user to type, handwrite, add audio and so forth to the currently-selected photograph 302. By having the annotation (which may be the actual data or a link to a data file) remain part of the metadata, the user may use a post-processing program such as the presentation program 222 of FIG. 2 to have the annotation appear over or proximate the photograph, or if audio be heard when the photograph is presented.

Figure 4:
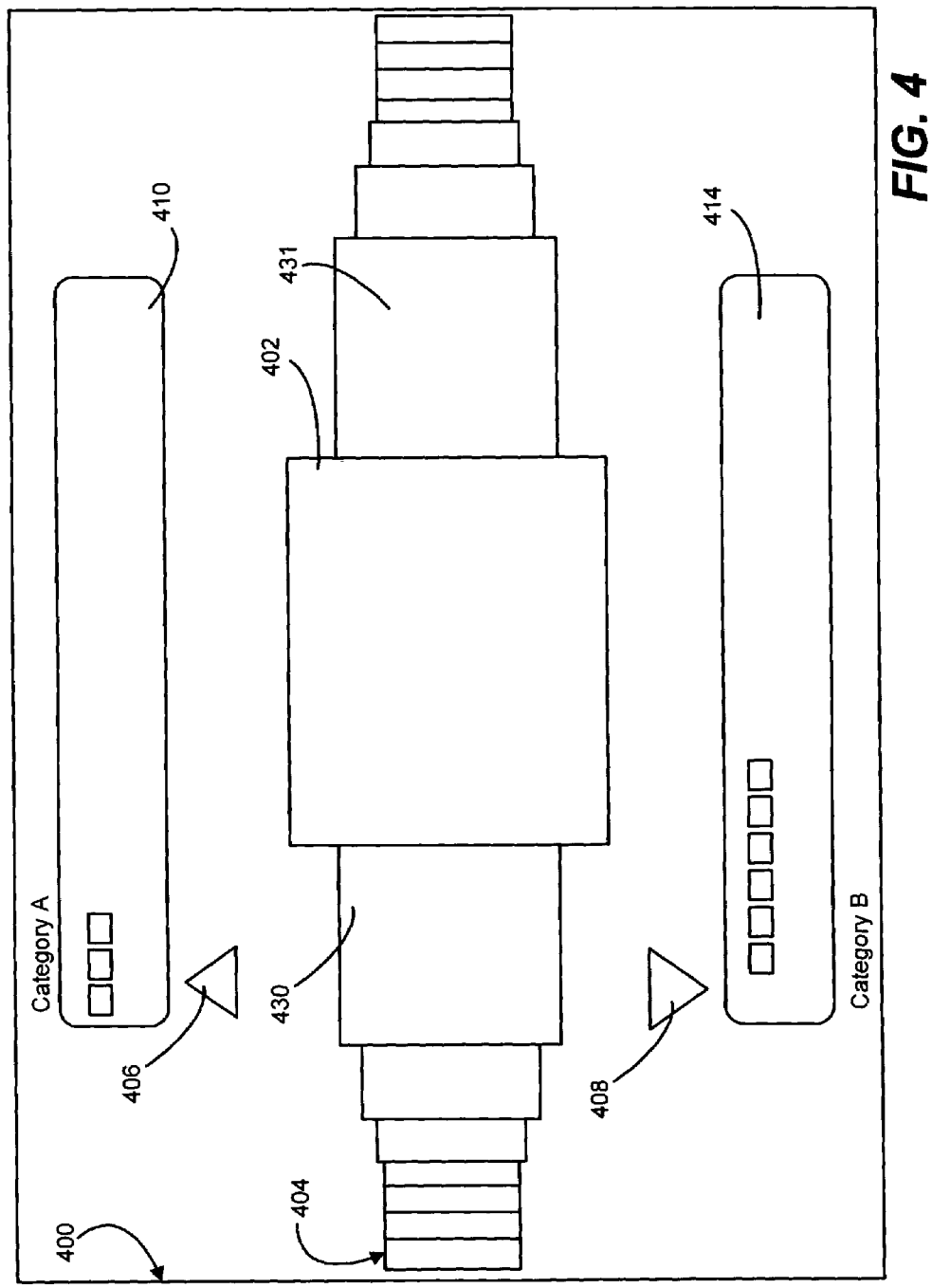
FIGS. 4-7 are representations of example, alternative user interface layouts in accordance with various aspects of the present invention.
Figure 5:
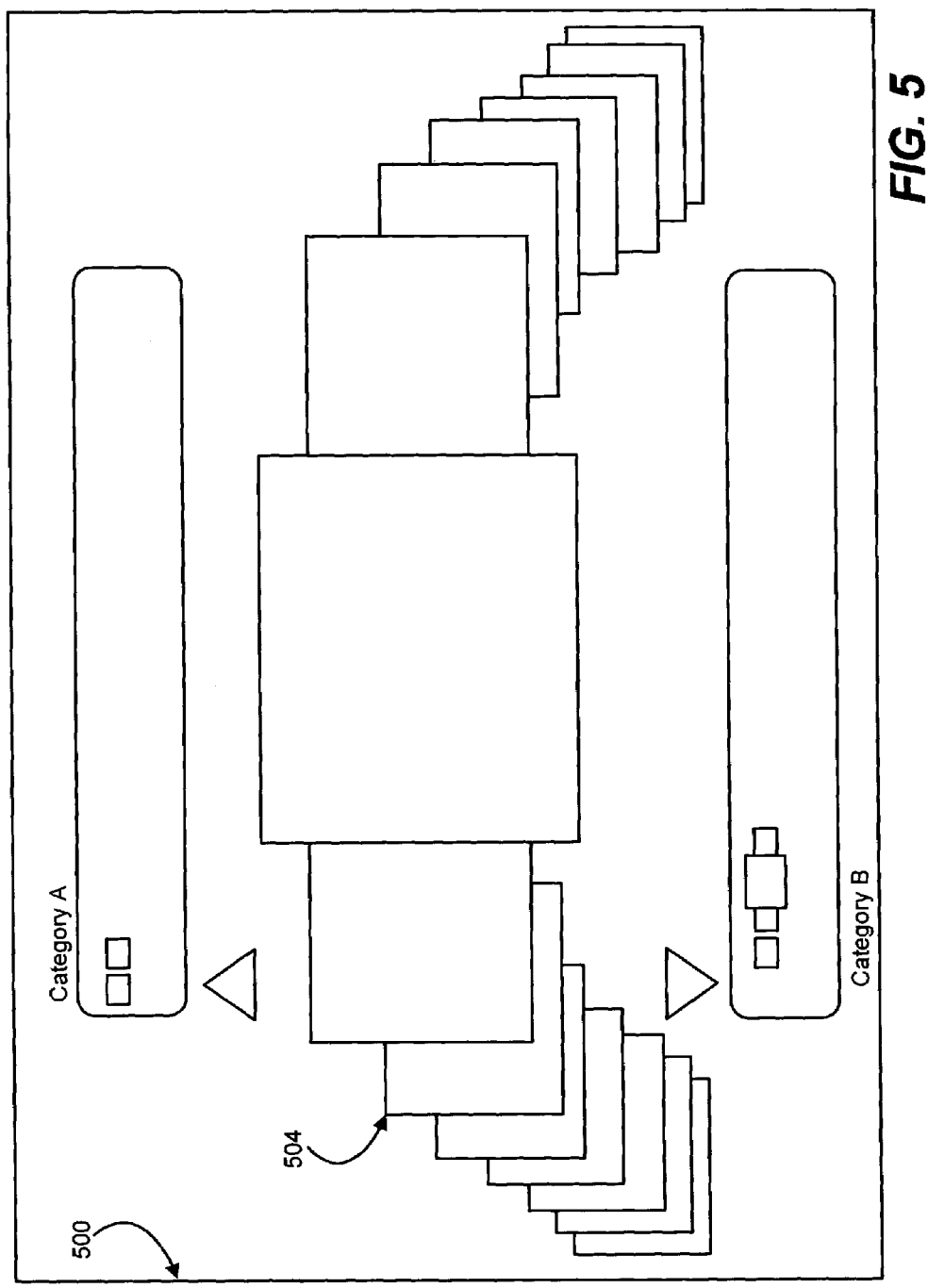

As can be readily appreciated, there are several possible alternative or additional user interfaces that may be implemented for sorting through digital photographs. Image size, number of images on the screen, and/or the user interface for sorting and annotating the photos each may be varied. For example, in FIG. 4, (in which boxes instead of actual photographs or other digital data are used for purposes of simplicity, and wherein like numbers to those of FIG. 3 are used where appropriate, except starting at 400), the two sets of data (e.g., digital photographs or email messages) 430 and 431 on either side of the selected data 402 are almost fully visible, providing additional context as to those immediately (e.g., in time) nearby the selected one. In FIG. 5, the set of digital data is not a straight line, which for example allows past and upcoming photographs to have more visible area, a side as well as the bottom, in this example.

Figure 6:
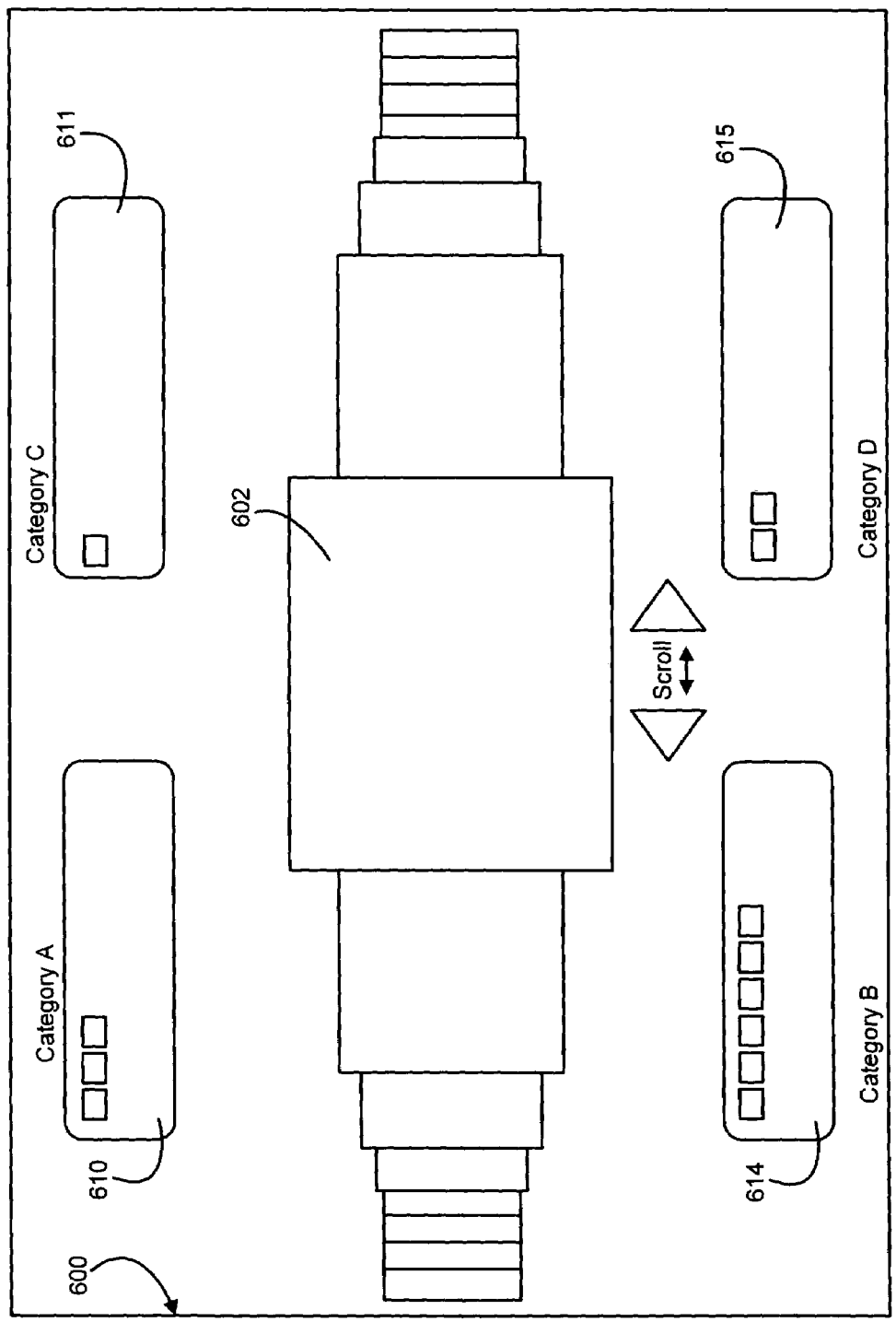

FIG. 6 shows a user interface 600 with four category areas 610, 611, 614 and 615. As with any of the user sorting interfaces, a user may select which representative category locations appear on the screen and where they each appear. For example, a user can use a pointing device to drag an icon representing a category to an on-screen location, which the program can reposition and size for symmetry depending on the number of representative category locations chosen; likewise a user can remove a default representative category location such as by right-clicking on it or dragging it elsewhere.

Once the user has the desired representative category locations present, the user can use the keyboard as described above (possibly requiring more than just the cursor keys) and/or may drag the currently-selected photograph 602 to one of the categories and release. In one touch-screen implementation, for better speed, a pen gesture starting from anywhere on the selected photograph 602 in a direction towards one of the categories can suffice to move it to that category, while lifting the pen cancels categorization until later. The pen may have to be held on the photograph 602 for some amount of time, such as a half-second, before the gesture works; a visual indication such as a flashing border may be provided to indicate when the gesture will have an effect. Alternatively, the user can simply tap a selected one of the representative category locations and have the currently-selected image assigned to that category. When no keys are present such as on a tablet, another mechanism is provided to scroll. For example, in the example implementation of FIG. 6, tapping scroll icons 640 and 642 will scroll through the photographs one at a time; holding the pen on a scroll icon scrolls through them at an appropriate rate. While many contemporary tablets need a pen based input, if a finger can be used as the pointing mechanism, the natural flow of the interface can be enhanced even more. As can be readily appreciated, numerous other variations may be implemented.

In accordance with an aspect of the present invention, clustering (or grouping) is directed to one common issue when multiple snapshots are taken in immediate temporal proximity with each other, or grouped by some other criteria. Clustering by time is often useful with in portraits or group shots, where a single best image is desired. As can be readily appreciated, the user interface may be arranged to indicate in advance that a number of similar shots are coming, such as by having different color frames around the photographs of different clusters, by having something on the display such as hash marks indicate where clusters start and end or by having spacing between clusters of photographs to give some indication of the difference in time between when the shots were taken.

Note that clustering need not be by time, but instead may be accomplished with other metadata. For example, GPS data provides an alternative clustering criteria. Similarly, the user can assign a cluster to a set of digital data and also add digital data to that cluster (e.g., using the sorting mechanism described above). For example, a user may want to sort photographs of a child's baseball games into a cluster, even though those games were over a season, with many intervening photographs taken. Email messages are another type of data that may be clustered by criteria other than time received, such as by sender.

Sometimes a single image on the screen at any one time is best, because for example, it maximizes the screen size of image thereby allowing the best observation of the details, and facilitates attention on one image. However, there are also situations where it is beneficial to have several images on the screen at the same time to allow for rapid comparisons. In general, people can sort through images more quickly if they can see more than one image at once, with a reasonable balance between multiple images being shown simultaneously versus maximizing screen real estate.

Figure 7:
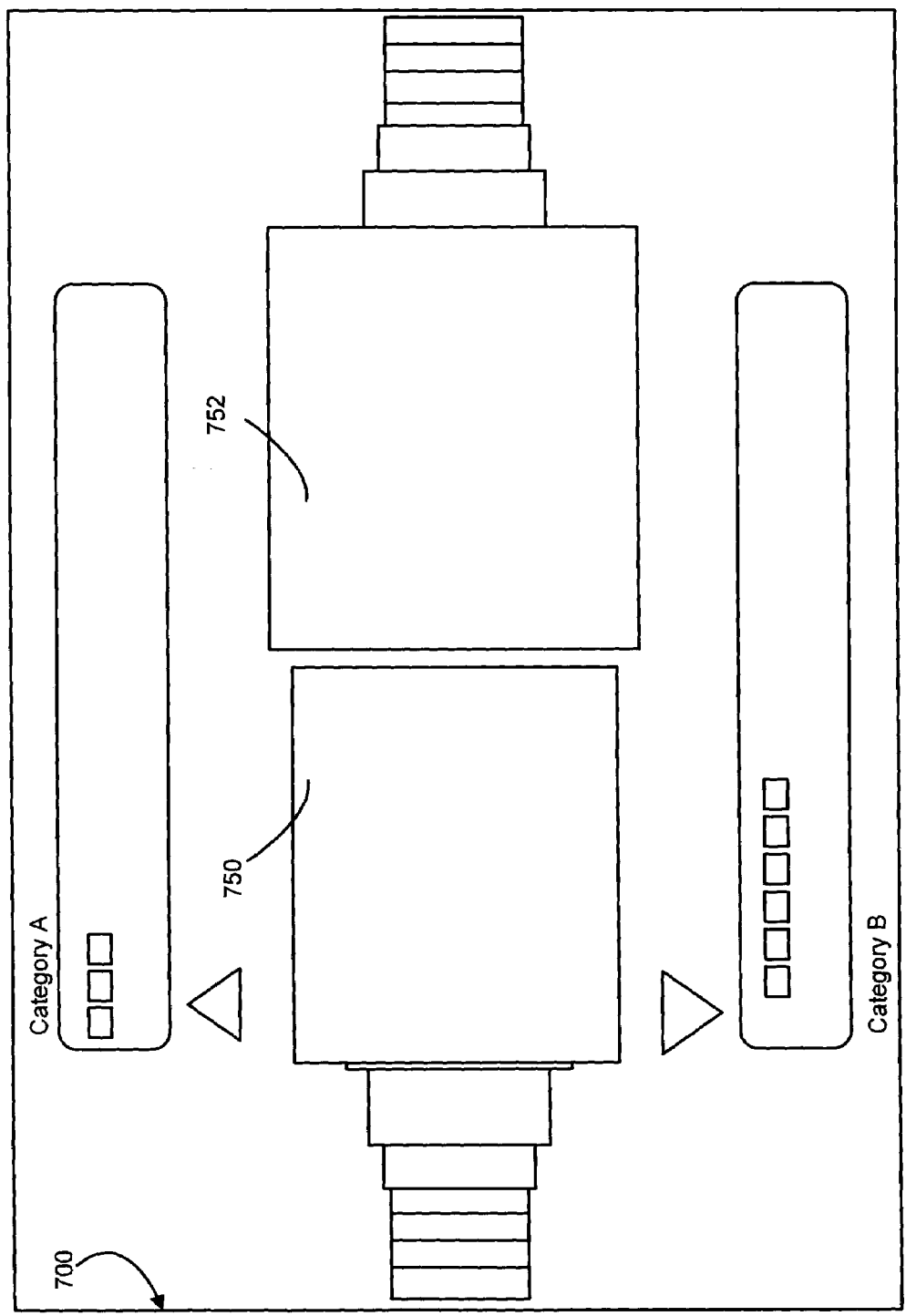

One interface 700 for such simultaneous comparison is shown in FIG. 7, which shows the ability to choose data such as the best shot from several similar pictures, and thus guides in selection between two digital photographs. For example, it is quite common to take a number of nearly identical photographs one right after the other, and then choose the best, e.g., where no one blinked their eyes, and so on. By another selection mechanism, such as hovering over with a pointing mechanism, pointing and clicking, using another keyboard key and so forth, two (or more) photographs 750 and 752 may be selected for closer comparison, such as in the side-by-side manner shown in FIG. 7. For example, the currently-selected photograph 402 of FIG. 4 can be bumped to the left or the right as appropriate when another photograph such as 431 is hovered over or otherwise secondarily selected. Note that as in FIG. 7, the currently-selected photograph 752 is shown zoomed slightly larger than the secondarily selected photograph, but some other means of indicating the current versus secondary selection is feasible.

Figure 8:
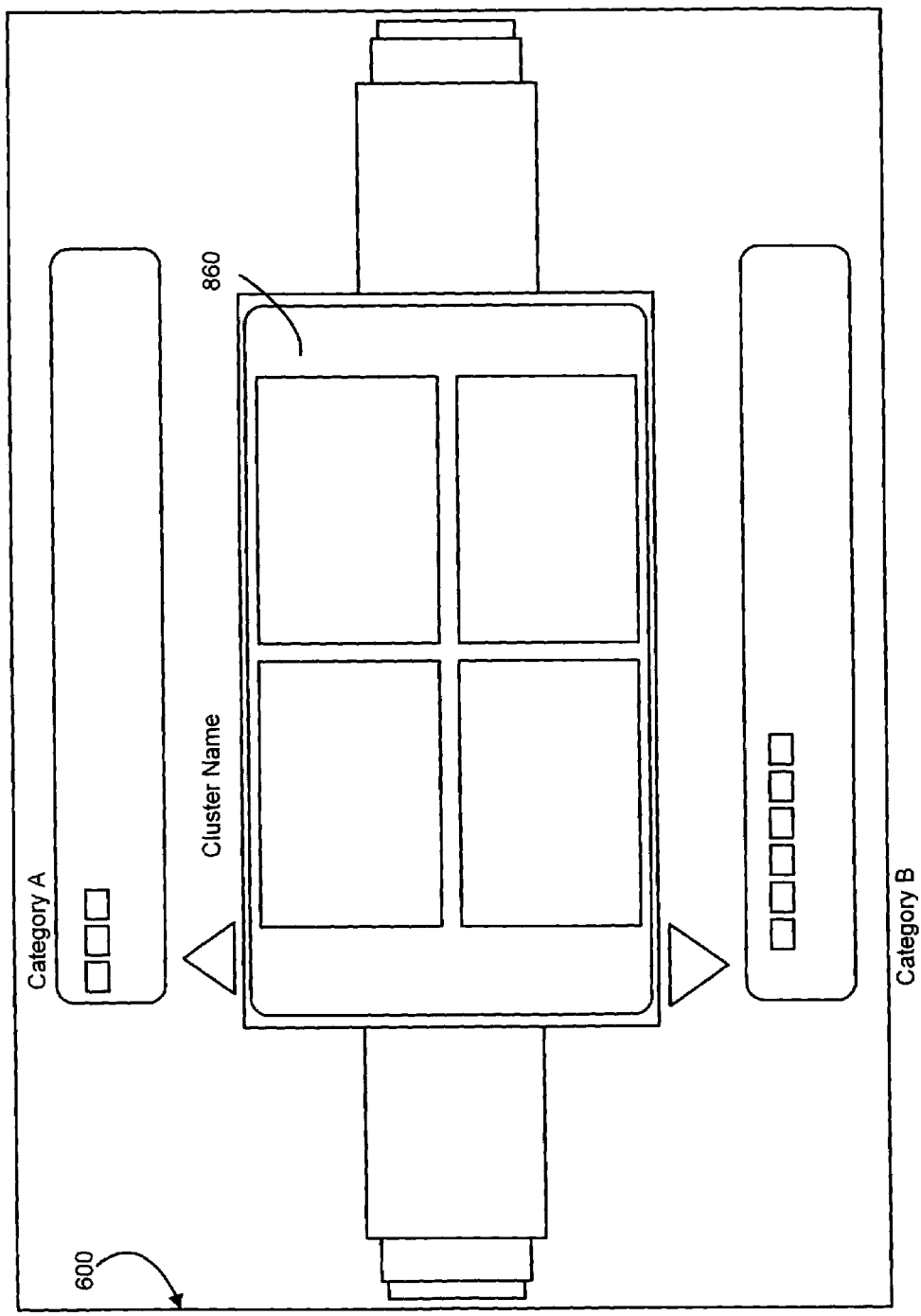
FIG. 8 is a representation of an example user interface layout suitable for grouping data, in accordance with various aspects of the present invention.

In addition to direct comparison by primary and secondary selections, the reviewer may simultaneously look at some or all of the shots within a cluster, in order to select the best shot. FIG. 8 shows the concept of the photographs (or some subset thereof) of a cluster being presented to the reviewer simultaneously, with some visual indication such as the framed, shaded area 860 indicating the clustering. More or all of the screen area may be used, as appropriate.

It can be readily appreciated that looking at pictures is often a joint experience, and thus Media Center settings may be used in conjunction with the present invention. Note that although not shown, a big screen such as a high-definition television monitor may be used in conjunction with the computing device that is running the sorting program, (without necessarily displaying the same content), such that larger images may be reviewed for sorting, possibly by multiple reviewers. Such multiple, parallel presentations let more than one person sort through photos at the same time; the large display may contain only the appropriate UI elements that are necessary for the task.

Although the varieties of user interfaces are virtually unlimited, various characteristics and requirements are generally the same for each. In general, to provide a natural viewing experience, the images need to be large enough to see details like faces, whereby thumbnail views are only marginally useful and thus used to help augment the slideshow or the filmstrip viewer. Additionally, the user interface preserves context for sorted and/or annotated photographs, whereby photographs are not (at least from the user's perspective) copied into separate folders, but instead are kept with the photos around them, such as in time. Viewing and sorting are also rapid, possibly faster than manual sorting of developed pictures used to be. Further, the user interfaces described herein provide immediate feedback and reinforcement of sorting in that file views of photos immediately reflect the results of sorting (e.g., added annotations). Moreover, by having the photographs arranged in time, or in another grouping as described below, simple comparisons of similar looking photos are enabled, e.g., the best of several, similar photos can be quickly reviewed to select the best one or ones.

To summarize, an aspect of the present invention is based on an augmented slide show interface, in which in one implementation, a stream of images is shown to the user, with the currently-selected image being expanded to appear as the largest. Information about clustering and ratings may appear, and images may be separated or otherwise grouped based on time clusters and/or clusters according to other criteria. Images can easily be categorized into one of two or more categories, (or skipped), which can be accomplished via keyboard, remote control, mouse, or gestural interfaces.

Other features may be supported, including undoing and redoing, providing the ability to take back the last classification. Multiple levels of undo may be supported (as well as redo), with appropriate visual effects. For example, when undoing, the image may animate back from the appropriate area on the screen where the image was classified, with any indications on the image itself removed.

Turning to an explanation of the metadata, after an image is sorted, the categorization annotation (or lack thereof) may be used in a variety of ways by other applications to change the way that images are presented to the user. The annotations may be stored within the file (e.g., using EXIF tags), within the file system attributes, and/or by using auxiliary files. Automatic viewers (such as the presentation program 222) can then filter via the metadata to show the best images, or all the images and/or any category of images.

The following comprises an example XML file, which may be associated with or incorporated into the image in some manner, and that shows the annotations added by sorting in accordance with the various mechanisms described above:

```
<TriageDataStore>
- <TriageData FileName="C:\photoTriage\Thanksgiving 023.jpg"
ExifCreationTime="11/28/2002 2:41:48 PM" Rating="1" Caption="Thanksgiving
Turkey">
- <TriageDetails LocalTriageCount="2">
    <State Type="KeepReject" Value="NA" GlobalTriageIdx="0"
TriageTime="6/15/2004 3:43:59 PM" />
    <State Type="KeepReject" Value="Keep" GlobalTriageIdx="0"
TriageTime="6/15/2004 3:44:01 PM" />
  </TriageDetails>
  <MetaData />
  </TriageData>
- <TriageData FileName="C:\PhotoTriage\Thanksgiving 036.jpg"
ExifCreationTime="11/28/2002 4:05:45 PM" Rating="0" Caption="">
- <TriageDetails LocalTriageCount="1">
    <State Type="KeepReject" Value="Skip" GlobalTriageIdx="0"
TriageTime="6/15/2004 3:44:02 PM" />
  </TriageDetails>
  <MetaData />
  </TriageData>
- <TriageData FileName="C:\PhotoTriage\Thanksgiving 037.jpg"
ExifCreationTime="11/28/2002 4:05:56 PM" Rating="-1" Caption="">
- <TriageDetails LocalTriageCount="1">
    <State Type="KeepReject" Value="Reject" GlobalTriageIdx="0"
TriageTime="6/15/2004 3:44:04 PM" />
  </TriageDetails>
  <MetaData />
  </TriageData>
- <TriageData FileName="C:\PhotoTriage\Thanksgiving 038.jpg"
ExifCreationTime="11/28/2002 4:06:04 PM" Rating="0" Caption="">
- <TriageDetails LocalTriageCount="1">
    <State Type="KeepReject" Value="Skip" GlobalTriageIdx="0"
TriageTime="6/15/2004 3:44:05 PM" />
  </TriageDetails>
  <MetaData />
  </TriageData>
- <TriageData FileName="C:\PhotoTriage\Thanksgiving 062.jpg"
ExifCreationTime="11/28/2002 4:34:50 PM" Rating="1" Caption="Bridge at Dusk">
- <TriageDetails LocalTriageCount="2">
    <State Type="KeepReject" Value="NA" GlobalTriageIdx="0"
TriageTime="6/15/2004 3:44:13 PM" />
    <State Type="KeepReject" Value="Keep" GlobalTriageIdx="0"
TriageTime="6/15/2004 3:44:15 PM" />
  </TriageDetails>
  <MetaData />
  </TriageData>
- <TriageData FileName="C:\PhotoTriage\Thanksgiving 063.jpg"
ExifCreationTime="11/28/2002 4:34:55 PM" Rating="0" Caption="">
- <TriageDetails LocalTriageCount="1">
```

-continued

```
    <State Type="KeepReject" Value="Skip" GlobalTriageIdx="0"
TriageTime="6/15/2004 3:44:16 PM" />
    </TriageDetails>
    <MetaData />
    </TriageData>
- <TriageData FileName="C:\PhotoTriage\Thanksgiving 072.jpg"
ExifCreationTime="11/28/2002 4:39:10 PM" Rating="-1" Caption="">
- <TriageDetails LocalTriageCount="1">
    <State Type="KeepReject" Value="Reject" GlobalTriageIdx="0"
TriageTime="6/15/2004 3:44:18 PM" />
    </TriageDetails>
    <MetaData />
    </TriageData>
- <TriageData FileName="C:\PhotoTriage\Thanksgiving 073.jpg"
ExifCreationTime="11/28/2002 4:42:38 PM" Rating="-1" Caption="">
- <TriageDetails LocalTriageCount="1">
    <State Type="KeepReject" Value="Reject" GlobalTriageIdx="0"
TriageTime="6/15/2004 3:44:19 PM" />
    </TriageDetails>
    <MetaData />
    </TriageData>
    </TriageDataStore>
```

Figure 9A:
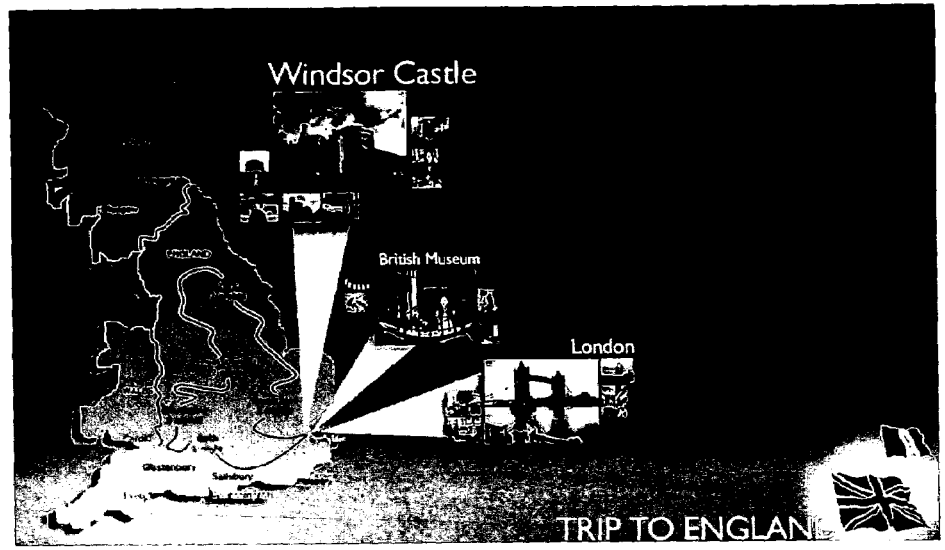
FIGS. 9A and 9B are representations of presentations authored with metadata including sorting metadata obtained in accordance with various aspects of the present invention.
Figure 9B:
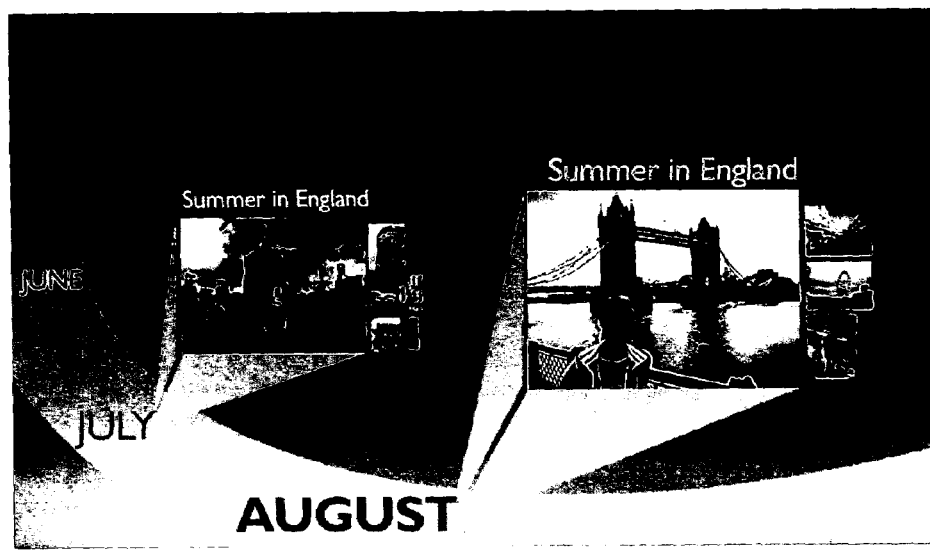

Other applications may then make use of the classifications and other information that have been put onto the data, and for example allows users to group by category, facilitating users or automated processes to find the pictures that have been previously classified. For example, once a set of data such as image files have been classified, presentations that do not follow the typical linear format may be generated so that, for example, people may delve into areas where they want to see more information, or pivot on some piece of metadata to branch off in new directions. As can be seen from the above XML metadata, presentations may be automatically generated from the metadata created by the sorting along with other associated metadata (e.g., time of shot, location), and thus show an example of an ongoing stream of events available for people to browse. FIGS. 9A and 9B show an example presentation, which was automatically authored (at least in part) via dynamic presentation templates that leveraged the information provided during the sorting process along with other metadata that was available (e.g., annotations with location data in FIG. 9A and with time stamp data in FIG. 9B).

As can be seen from the foregoing detailed description, there is provided a method and system for applying metadata to other data in a highly beneficial and straightforward manner. As one example, the present invention provides interfaces and experiences that make annotating and classifying digital photographs significantly easier and faster. The present invention further provides automatic clustering and automatic annotation tools to assist in manual annotation of digital data such as photographs, along with interfaces to facilitate rapid sorting of the digital photographs, providing implicit and explicit annotation benefiting authors and/or viewers.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for visually arranging and managing digital files in categories based on interaction by a user with a graphical user interface displaying the digital files and categories for the digital files, the method comprising:

accessing a set of digital data, the set of digital data comprising a plurality of digital files to be categorized by a user in one or more of a plurality of different categories;

simultaneously displaying a plurality of digital files of the digital data set for categorization by the user, wherein the plurality of digital files for categorization by the user are displayed in a window of a graphical user interface and arranged in a one-dimensional framework, such that regardless of the number of digital files in the set of digital data, each of the plurality of digital files is displayable in the one-dimensional framework in a single, generally linear stream of images, and such that each of the plurality of digital files displayed in the single, generally linear stream of images is selectable by scrolling through the images in a linear direction;

while displaying the generally linear stream of images, displaying at least one category available for categorizing the plurality of digital files, wherein the at least one category is displayed in a category area, and wherein the category area displays thumbnail images of the digital files of the set of digital data which are associated with the category;

receiving user scrolling instructions via a selection device to scroll linearly through the linear stream of images to select a particular digital file from among the plurality of digital files to be categorized by the user, and such that the selected particular digital file is viewed in context with other digital files simultaneously displayed on either side of the selected digital file within the single, generally linear stream of images;

receiving user selection of a particular category corresponding to the particular digital file, wherein the particular category is identified by user input in the form of user selection of a directional button, the directional button identifying a direction perpendicular to the generally linear stream of images;

storing category information in association with the particular digital file, the category information corresponding to how the particular digital file has been categorized by the user; and after receiving the user selection of the particular category, displaying a thumbnail image of the particular digital file in a category area associated with the particular category selected by the user.

2. The method of claim 1 wherein storing the category information comprises storing metadata.

3. The method of claim 2 wherein the digital files comprise digital photographs, and wherein storing metadata comprises storing an indication of whether a digital photographs has been sorted into at least one category of a set containing: a hidden category, a private category, a majority category, a highlights category, a best category or a representative category.

4. The method of claim 1 further comprising, receiving a user command via the graphical user interface and scrolling based on the command.

5. The method of claim 1 further comprising, receiving a user command via the graphical user interface and sorting based on the command.

6. The method of claim 1 further comprising, arranging the digital files to scroll in time order based on time data associated with each digital file.

7. The method of claim 1 wherein the image shown as a selected digital file is larger than any other image representative of a simultaneously displayed digital file.

8. The method of claim 1 wherein at least some of the digital files are grouped into clusters, and further comprising, displaying an image representative of a digital file in conjunction with a visible indication that indicates that the image's corresponding digital file belongs to a cluster.

9. The method of claim 1 further comprising, processing the category information to filter output corresponding to the digital files.

10. The method of claim 1 wherein the digital files comprise a subset of a larger collection of digital data that has been previously narrowed.

11. At least one physical computer-readable storage medium having computer-executable instructions, which when executed perform the method of claim 1.

12. The method of claim 1 wherein the user scrolling instructions correspond to manual keyboard input.

13. The method of claim 1 wherein the user scrolling instructions correspond to input from a pointing device.

14. The method of claim 1 wherein the user scrolling instructions correspond to an instruction to automatically scroll until otherwise halted.

15. The method of claim 1 wherein identifying user input selection of a directional button comprises detecting actuation of a keyboard key corresponding to a currently-selected image and a category.

16. The method of claim 1 identifying user input selection of a directional button comprises detecting a pen gesture corresponding to a currently-selected image and a category.

17. The method of claim 1 comprising displaying frames of one color around images of one cluster and displaying frames of another color around images of another cluster.

18. The method of claim 3, further comprising ranking digital files within the at least one category.

19. The method of claim 1, wherein the generally linear stream of images is substantially horizontal, and wherein the second linear direction is substantially vertical.

20. In a computing environment, a method for visually arranging and rapidly categorizing digital photographs based on interaction by a user with a graphical user interface displaying the digital photographs and available categories for the digital photographs, the method comprising:

accessing a set of digital photograph files available for categorization by a user into one or more of a plurality of different categories;

displaying a plurality of digital photograph files of the set of digital photograph files, wherein all of the displayed plurality of digital photograph files are arranged in a generally linear, horizontal stream of images;

displaying at least a first category above the generally linear, horizontal stream of images and at least a second category below the generally linear, horizontal stream of images, the at least a first category and at least a second category representing different categories for sorting the set of digital photographs, and each of the first category and the second category having an associated category area, wherein the category areas for the first and second categories include a display of thumbnail images of the digital photograph files of the set of digital photograph, the displayed thumbnail images being associated with digital photograph files associated with each respective category;

receiving user scrolling instructions to scroll horizontally through the linear, horizontal stream of images, wherein the user scrolling instructions consist of a user selecting a left or right directional button;

in response to receipt of the user scrolling instructions, scrolling horizontally through the linear, horizontal stream of images, and wherein scrolling horizontally through the linear, horizontal stream of images automatically selects at least one particular digital photograph file corresponding to an image displayed in a middle portion of the horizontal stream of images;

receiving user sorting instructions to sort the selected at least one particular digital photograph file into one of the first category or the second category, wherein the user sorting instructions consist of a user depressing an up or down directional button;

storing category information in association with the particular digital photograph file, the category information corresponding to how the particular digital photograph file has been categorized by the user by selection of the up or down directional button; and displaying a thumbnail image of the selected particular digital photograph file within the category area for the selected one of the first category or the second category.

21. The method of claim 20, wherein the first category area and the second category area are each marked by a border around each of the first category area and the second category area, and wherein thumbnail images of digital photograph files within the set of digital photograph files that have category information corresponding to the respective category are displayed inside the respective border.

22. The method of claim 21, further comprising:

upon receiving user sorting instructions to sort the selected at least one particular digital photograph file into one of the first category or the second category, displaying a thumbnail image of the particular digital photograph file in the border of the selected category.

23. The method of claim 21, wherein a thumbnail image of the particular digital photograph file is displayed in an enlarged size within the border while the particular digital photograph file is selected in the horizontal stream of images.

24. The method of claim 20, further comprising displaying each of the images in the generally linear, horizontal stream of images inside a frame.

25. The method of claim 24, wherein a cluster of digital photograph files are represented by an single image within a frame of the generally linear, horizontal stream of images, and wherein the single image includes a plurality of thumbnails representing each digital photograph file of the cluster of digital photograph files.

26. The method of claim 25, wherein the cluster includes a gap displayed between images of the cluster and other images.

* * * * *